United States Patent Office 2,936,316
Patented May 10, 1960

---

2,936,316

CHELATED METAL COMPOUNDS

Walter T. Young, Jr., Fair Lawn, N.J., assignor, by mesne assignments, to Chicopee Manufacturing Corporation, New Brunswick, N.J., a corporation of Massachusetts No Drawing. Application February 25, 1955
Serial No. 490,677

1 Claim. (Cl. 260—439)

This invention relates to chelated di- and trivalent metal compounds primarily for use in treating deficiencies of these compounds in trees, plants, grasses, and other vegetable growths, and to methods of producing said chelated di- and trivalent metal compounds.

As reported in Plant Physiology, vol. 26, No. 2, April 1951, pages 411 to 413, chelated iron is useful in the treatment of iron chlorosis in plants, trees, and the like. Other di- and trivalent metals in the form of chelates may also be made available to plants to overcome various trace deficiencies.

The normal chelating agent used for this purpose is ethylene diamine tetraacetic acid, frequently designated as EDTA, in which up to 1 mol of iron per mol of ethylene diamine tetraacetic acid (EDTA) can be chelated.

It has also been found that the ethylene diamine tetraacetic acid in itself is sometimes injurious to plants, trees and other vegetable growths, especially in large amounts, and that excessive use of EDTA iron compounds may result in damage to the plant from the EDTA.

It is the object of this invention to provide a polyamino carboxylic acid compound capable of chelating iron and other metals in which more than 1 mol of iron per mol of polyamino compound can be incorporated, whereby a greater amount of iron may be fed to the plants, trees, and the like, with a lesser amount of the polyamino acid compound.

Another object of the invention is to provide a chelating compound of the type described in which 2 or more mols of iron or other di- or trivalent metal or mixtures thereof may be chelated with 1 mol of the polyamino compound, whereby equal amounts of iron and other di- and trivalent metals may be fed to the plant while only one-half or less of the amount of the polyamino compound is fed to the plant.

Another object of the invention is to provide methods of producing polyamino carboxylic acid compounds and their salts in which more than 1 mol of iron or other di- or trivalent metal may be combined per mol of the polyamino compound.

Another object of the invention is to reduce the cost of chelating agents for soil treatment by providing chelated metal compounds which carry a larger amount of the chelated metal per unit of the more expensive amino acid.

Various other objects and advantages of my invention will appear as this description proceeds.

In the treatment of trees, plants, grasses, and other vegetable growths for iron chlorosis or for other trace element deficiencies, it has become apparent that the use of the normal ethylene diamine tetraacetic acid iron chelates, including also hydroxy ethyl ethylene diamine triacetic acid iron chelates, di-ethylene triamine pentaacetic acid iron chelates, and similar related compounds which are capable of chelating only 1 mol or iron per mol of the polyamino compound, have serious objections which greatly limit their use.

For these, and various other reasons, it is desirable to make available to the plants, trees, grasses, and the like a readily assimilable chelated metal compound carrying an increased amount of iron or other di- or trivalent metal with a reduced or minimum amount of the polyamino carboxylic acid compound.

In addition, many types of polyamino carboxylic acid compounds into which iron has been chelated are not stable under neutral or alkaline conditions as the chelated iron or other metal is precipitated from the compound as the hydroxide. They are, therefore, unsuitable for use in soils other than soil which are on the acid side.

I have found that by reacting glycerol monochlorohydrin, or similar compounds supplying

—CH$_2$CHOHCH$_2$OH groups or radicals with ethylene diamine and then reacting the resulting dihydroxyamine with an alkaline cyanide and formaldehyde or monochloroacetic acid, a new polyamino compound which is able to chelate 2 mols or more of iron per mol of polyamino compound may be produced. Furthermore, this complex furnishes iron, in a form which the plants can assimilate, from acid, neutral or alkaline media. It will be obvious as this description proceeds that 1 mol of metal ion other than iron, as well as mixtures of 1 or more mols of iron with other metals, may be incorporated in the complex for each mol of polyamino compound and made available for plant consumption.

The following examples are given for the purpose of illustrating the practice of my invention, but not of limiting the same thereto, as it will be evident that various other compounds similar to those hereinafter described may be produced following the teachings and examples of this description.

EXAMPLE I 1 mol of glycerol monochlorohydrin is fed slowly into an excess of ethylene diamine, the temperature being maintained at 140° to 180° F. The solution is agitated until addition of the monochlorohydrin is complete, then the temperature is raised and the solution is refluxed for 1 or 2 hours. At the end of this period the solution is neutralized with NaOH and distilled under vacuum.

The unreacted ethylene diamine is recovered. The fraction boiling at 186° C. and 7 mm. is N-2-amino ethyl-2,3-dihydroxy propylamine,

NH$_2$CH$_2$CH$_2$NHCH$_2$CHOHCH$_2$OH and the material remaining in the distillation flask is N,N' ethylene bis-2-3-dihydroxy propylamine with traces of glycerine and salt.

1 mol of N-2-amino ethyl-2,3-dihydroxy propylamine is reacted with 1.0 mol of an alkali metal cyanide and 1.0 mol of formaldehyde for each replaceable hydrogen on the nitrogen atoms of the amine. A typical formulation is:

| | Grams |
|---|---|
| Water | 200 |
| NaOH | 40 |
| N-2-amino ethyl-2,3-dihydroxy propylamine | 331 |
| NaCN (35% solution) | 1000 |
| CH$_2$O (37%) | 583 |

The water, amine, caustic alkali and 25% of the NaCN solution are charged into a reactor equipped with an agitator, means for heating and cooling, and a vent for evolved NH$_3$. The charge is maintained at approximately 200° F. although the temperature is not critical. Formaldehyde is fed slowly into the reactor; agitation must be sufficient for good dispersion of the formaldehyde, otherwise darkening and side reactions will occur. Additional cyanide may be added continuously or batchwise, or the cyanide and formaldehyde may be fed into the reactor continuously, care being taken to maintain an excess of 10 to 25% of cyanide at all times. This ratio is not critical, but under no conditions should there be an excess of formaldehyde until the reaction is complete.

After all the formaldehyde and cyanide have been added, the temperature is raised to complete hydrolysis of the nitrile and expel residual $NH_3$.

The resulting compound is represented by the structural formula $$\begin{array}{c} NaOOCCH_2 \\ \phantom{NaOOCCH_2}\diagdown \\ \phantom{NaOOCCH_2}NCH_2CH_2N \\ \phantom{NaOOCCH_2}\diagup \\ NaOOCCH_2 \end{array} \begin{array}{c} CH_2CHOHCH_2OH \\ \diagup \\ \phantom{X} \\ \diagdown \\ CH_2COONa \end{array}$$

and is believed to be the trisodium salt of ethylene diamine N-2,3-dihydroxy propyl N-ethanoic acid N'-diethanoic acid. This compound has chelating and other properties similar to ethylene diamine tetraacetic acid and related polyamino carboxylic acids and may be used for similar purposes thereto.

In order to produce iron or other metal chelates for use in the treatment of plant, tree, grass and other vegetable growth for iron deficiencies, 1 mol of ethylene diamine N-2,3-dihydroxy propyl N-sodium ethanoic acid N'-disodium diethanoic acid is reacted with 1 mol of a soluble ferrous salt, such as ferrous sulfate, chloride, acetate or the like, and the pH adjusted somewhere in the range of 3.0 to 9.0, and preferably between 4.5 to 7.0.

The resulting chelate, $$\begin{array}{c} NaOOCCH_2 \\ \diagdown \\ NCH_2CH_2N \\ \diagup \phantom{X} \diagdown \\ CH_2 \phantom{XX} CH_2 \\ \diagdown \phantom{X} \diagup \\ COO\text{-}Fe\text{-}OOC \end{array} \begin{array}{c} CH_2CHOHCH_2OH \\ \diagup \end{array}$$

designated hereafter as Compound 1A, produces a much better response in plants treated therewith than the corresponding ethylene diamine tetraacetic acid iron chelates when tested in water cultures with chlorotic sunflower plants.

To add 2 mols of iron or other metal to a chelate of this type, 1 mol of ethylene diamine N-2,3-dihydroxy propyl N-sodium ethanoic acid N'-disodium ethanoic acid, as described above, is treated with 1 mol of a soluble ferrous salt, such as ferrous sulfate, chloride, acetate, or the like, and 1 mol of a soluble ferric salt, such as ferric sulfate, chloride, nitrate, acetate or the like, and the pH adjusted to the desired point, preferably between 4.5 and 7.0. The resulting complex $$\begin{array}{c} NaOOCCH_2 \\ \diagdown \\ NCH_2CH_2N \\ \diagup \phantom{X} \diagdown \\ CH_2 \phantom{XX} CH_2 \\ \diagdown \phantom{X} \diagup \\ COO\text{-}Fe\text{-}OOC \end{array} \begin{array}{c} CH_2CHOHCH_2OH \cdot Fe^{+++} \\ \diagup \end{array}$$

designated hereafter as Compound 1B, also shows better response than the ethylene diamine tetraacetic acid iron chelates when tested in water cultures with chlorotic sunflower plants, the amount of complex used being based on available iron. For the same amount of available iron only one-half the amount of the polyamino carboxylic acid is fed to the plants.

To add 3 mols of iron or other metal or a mixture thereof to said chelating compound, 1 mol of ethylene diamine N-2,3-dihydroxy propyl N-sodium ethanoic acid N'-disodium ethanoic acid, produced as described above or in any other manner, is treated with 1 mol of a soluble ferrous or other metal salt and 2 mols of a soluble ferric or other metal salt. The pH is adjusted to 4.5 to 7.0.

The resulting complex is represented by the structural formula $$\begin{array}{c} NaOOCCH_2 \\ \diagdown \\ NCH_2CH_2N \\ \diagup \phantom{X} \diagdown \\ CH_2 \phantom{XX} CH_2 \\ \diagdown \phantom{X} \diagup \\ COO\text{-}Fe\text{-}OOC \end{array} \begin{array}{c} CH_2CHOHCH_2OH \cdot 2Fe^{+++} \\ \diagup \end{array}$$

EXAMPLE II

Two mols of glycidol $$(CH_2\!\!-\!\!\overset{O}{\overset{|}{\diagdown}}\!\!CHCH_2OH)$$

are reacted with 1.5 mols of ethylene diamine in the following manner. Ethylene diamine is charged into a reaction vessel provided with an agitator and with means for heating and cooling. The temperature is raised to 140° F. and a slow feed of glycidol is started. The reaction starts almost instantaneously with the evolution of heat. The temperature is preferably maintained between 160° and 180° F. for best control of the reaction although the reaction may be carried out at any temperature below the reflux temperature of the ethylene diamine. When the addition of the glycidol is completed, the reaction mass is refluxed for 1 to 2 hours to insure complete reaction. The resulting products are a mixture of

Product A $NH_2CH_2CH_2NHCH_2CHOHCH_2OH$
(N-2-amino ethyl-2,3-dihydroxy propylamine), and

Product B $$\begin{array}{c} CH_2\!\!-\!\!NHCH_2CHOHCH_2OH \\ | \\ CH_2\!\!-\!\!NHCH_2CHOHCH_2OH \end{array}$$

(N,N' ethylene bis-2,3 dihydroxy propylamine)

which products may be separated by vacuum distillation. The N-2-amino ethyl-2,3-dihydroxy propylamine may be worked up as described in Example I.

This reaction may be controlled to increase or decrease the amount of product A with reference to product B and the two products may be treated with cyanide and formaldehyde as described in Examples I and II hereof without being separated.

One mol of N,N' ethylene bis-2,3-dihydroxy propylamine is reacted with 2 mols of an alkali cyanide and 2 mols of formaldehyde in the presence of a soluble alkali under conditions essentially the same as in Example I. A typical formulation is

| | Grams |
|---|---|
| N,N' ethylene bis-2,3-dihydroxy propylamine | 210 |
| NaCN | 98 |
| NaOH | 20 |
| $CH_2O$ (37% solution) | 162 |
| Water | 1000 |

The cyanide-formaldehyde amine reaction may be carried out essentially as described in Example I. The resulting product is thought to be $$\begin{array}{c} CH_2OHCHOHCH_2 \\ \diagdown \\ NCH_2CH_2N \\ \diagup \\ NaOOCCH_2 \end{array} \begin{array}{c} CH_2CHOHCH_2OH \\ \diagup \\ \diagdown \\ CH_2COONa \end{array}$$

which is the disodium salt of ethylene diamine N,N'bis-2,3-dihydroxy propyl N,N' diethanoic acid.

Iron and other di- and trivalent metal chelates or complexes similar to those described in Example I may be formed with the compound disclosed immediately above, the difference being that this compound can chelate and supply two more mols of iron in a form that plants can assimilate than the compound disclosed in Example I. A series of complexes may be made following the procedure described toward the end of Example I using 1 mol of soluble ferrous salt and 1 to 4 mols of soluble ferric salt. In place of the ferrous and ferric salts, the salts of other di- and trivalent metals may be used. The complex

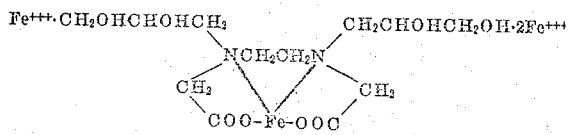

with 3 mols or less of $Fe^{+++}$ is more soluble than the compound

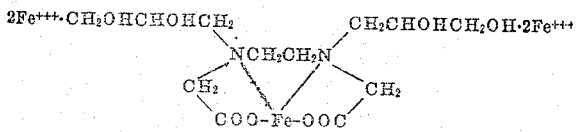

where all the —OH groups are theoretically saturated.

It will be evident to persons familiar with polyamino carboxylic acid chelates that metallic ions other than ferrous ion may be substituted in the chelates, thereby forming a complex which, when used for the treatment of plants, will tend to correct metal deficiencies other than iron deficiencies. Among the more common metals which may be added are manganese, zinc, magnesium, and calcium. The formation of these chelates is easily accomplished by treating 1 mol of the chelating agent disclosed in Examples I and II with 1 mol of soluble divalent metal salt and 1 or more mols of a soluble trivalent metal salt, and adjusting the pH of the resulting chelate to suit soil conditions. An example of such a complex would be

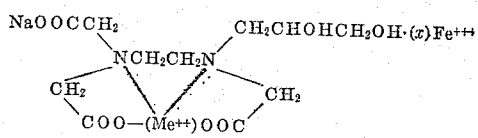

$x$ having the value of 1 or 2 depending upon the number of mols of soluble trivalent iron supplied.

The above designated compounds 1A and 1B were fed as water solution cultures to sunflower plants to compare their effectiveness with normal Fe-EDTA chelates and ferrous sulfate. Except for the source of the iron, all culture solutions were of the same composition. The plants were harvested after a nutrient treatment period of 33 days and comparisons made as to the gain in fresh weight and dry weight. The amount of iron in the nutrient solution was the same in all tests, namely 0.5 part per million. In the case of compound 1B, the amount of the chelating compound to carry this amount of iron was only one-half the amount of the chelate in compound 1A, and in the EDTA iron chelate, so that only one-half the amount of the chelating compound was fed to the plants cultured with the solution culture containing compound 1B. The results of these tests are set forth in the following table:

TABLE I

[Fresh weights, dry weights and average increase in weight of leaf, stem and root tissues of sunflower plants grown in culture solutions adjusted to pH 7.0 and supplied with 0.5 p.p.m. Fe from different nutrient sources.]

| Culture No. | Fe Source | Plant Fraction | Fresh Wt., gms. | Average Increase Fresh Wt. due to Chelate, Percent | Dry Wt., gms. | Average Increase in Dry Wt. due to Chelate, Percent |
|---|---|---|---|---|---|---|
| 1 | FeSO$_4$ | Leaves | 11.0 | 0 | 1.36 | 0 |
|   |   | Stems | 33.0 |   | 2.48 |   |
|   |   | Roots | 11.0 |   | 0.96 |   |
| 2 | FeSO$_4$ | Leaves | 10.0 |   | 1.35 |   |
|   |   | Stems | 33.0 |   | 2.29 |   |
|   |   | Roots | 11.0 |   | 0.79 |   |
| 3 | Fe-EDTA | Leaves | 39.0 | 410 | 4.60 | 305 |
|   |   | Stems | 149.0 |   | 7.66 |   |
|   |   | Roots | 52.0 |   | 2.83 |   |
| 4 | Fe-EDTA | Leaves | 37.0 |   | 4.17 |   |
|   |   | Stems | 129.0 |   | 6.76 |   |
|   |   | Roots | 41.0 |   | 2.11 |   |
| 5 | 1-A | Leaves | 42.0 | 438 | 4.86 | 318 |
|   |   | Stems | 163.0 |   | 8.66 |   |
|   |   | Roots | 49.0 |   | 2.32 |   |
| 6 | 1-A | Leaves | 38.0 |   | 4.25 |   |
|   |   | Stems | 136.0 |   | 6.82 |   |
|   |   | Roots | 49.0 |   | 2.48 |   |
| 7 | 1-B | Leaves | 42.0 | 427 | 5.02 | 365 |
|   |   | Stems | 152.0 |   | 8.09 |   |
|   |   | Roots | 46.0 |   | 2.91 |   |
| 8 | 1-B | Leaves | 43.0 |   | 5.60 |   |
|   |   | Stems | 136.0 |   | 8.88 |   |
|   |   | Roots | 47.0 |   | 3.11 |   |

Any alkali metal hydroxide or any alkali metal cyanide may be substituted for the sodium hydroxide or sodium cyanide used in the above examples, and substances yielding formaldehyde under the reaction conditions may be used in place of formaldehyde, and hydroxy compounds of propylene diamine may be substituted for hydroxy compounds of ethylene diamine listed above. Other polyhydroxy compounds or polyhydric alcohols may be used in place of those specifically described, and various other modifications and changes may be made in the examples and products described above, as will be apparent to persons skilled in the art, without departing from the spirit of my invention or the scope of the following claim.

I claim:

As a product of manufacture, a water-soluble chelated metal compound of the general formula

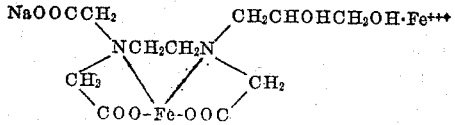

References Cited in the file of this patent

UNITED STATES PATENTS

| 2,606,830 | Kamlet | Aug. 12, 1952 |
| 2,808,435 | Young | Oct. 1, 1957 |
| 2,828,182 | Cheronis | Mar. 25, 1958 |
| 2,847,437 | Vaughan | Aug. 12, 1958 |
| 2,855,285 | Antognini | Oct. 7, 1958 |
| 2,862,945 | Lindstrom | Dec. 2, 1958 |

OTHER REFERENCES

Chemistry of The Metal Chelate Compounds, 1952, pp. 514–558.

Chaberek et al.: Science, vol. 118, p. 280 (1953).

Chaberek et al.: Jour. Am. Chem. Soc., 76, Jan. 5, 1954, pp. 215–218.